(12) United States Patent
Cochrane et al.

(10) Patent No.: US 11,254,254 B2
(45) Date of Patent: Feb. 22, 2022

(54) LOADING AND UNLOADING SYSTEMS AND METHODS

(71) Applicant: GM GLOBAL TECHNOLOGY OPERATIONS LLC, Detroit, MI (US)

(72) Inventors: David C. Cochrane, Oshawa (CA); Radu D. Sotir, Oshawa (CA); Jarvis Chau, Markham (CA); Steven Langille, Oshawa (CA); Amanda Kalhous, Ajax (CA); Shiv G. Patel, Toronto (CA); Alec M. Wuorinen, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/912,693

(22) Filed: Jun. 25, 2020

(65) Prior Publication Data
US 2021/0402908 A1    Dec. 30, 2021

(51) Int. Cl.
| | | |
|---|---|---|
| *B60P 1/44* | (2006.01) | |
| *B60P 1/64* | (2006.01) | |
| *B65G 67/02* | (2006.01) | |
| *B60P 1/38* | (2006.01) | |
| *B60P 1/43* | (2006.01) | |

(52) U.S. Cl.
CPC .......... *B60P 1/4457* (2013.01); *B60P 1/4414* (2013.01); *B60P 1/6427* (2013.01); *B60P 1/38* (2013.01); *B60P 1/43* (2013.01); *B60P 1/4407* (2013.01); *B60P 1/4471* (2013.01); *B60P 1/6454* (2013.01); *B60P 1/6463* (2013.01); *B65G 67/02* (2013.01); *B65G 2814/0313* (2013.01)

(58) Field of Classification Search
CPC ......... B60P 1/38; B60P 1/4414; B60P 1/4457; B60P 1/6427; B60P 1/649
USPC ............. 414/501, 518, 525.1, 546, 549, 679
See application file for complete search history.

(56) References Cited

U.S. PATENT DOCUMENTS

| | | | | |
|---|---|---|---|---|
| 1,052,096 A | * | 2/1913 | Schulze ................ | B60P 1/6427 414/549 |
| 2,521,727 A | * | 9/1950 | Kappen ..................... | B60P 1/00 414/501 |
| 2,916,169 A | * | 12/1959 | De Witt .................... | B60P 1/38 414/528 |
| 3,204,797 A | * | 9/1965 | Chandler .............. | B60P 1/6427 414/501 |
| 3,451,572 A | * | 6/1969 | Rossoni ................ | B60P 1/4457 414/498 |
| 3,679,074 A | * | 7/1972 | Kuehl ........................ | B60P 1/38 414/523 |

(Continued)

FOREIGN PATENT DOCUMENTS

| | | | | |
|---|---|---|---|---|
| DE | 102008048337 A1 | * | 3/2010 | ............ B60P 1/4414 |
| GB | 2041321 A | * | 9/1980 | ............... B65G 1/06 |
| GB | 2124179 A | * | 2/1984 | ............ B60P 1/4421 |

*Primary Examiner* — James Keenan
(74) *Attorney, Agent, or Firm* — Lorenz & Kopf LLP

(57) ABSTRACT

Methods and systems are provided for loading and unloading an item onto a vehicle. In one embodiment, a system includes: a loading system configured to receive a locker configured to store the item; a shuttle transfer system configured to transfer the locker to a storage position within the vehicle; and a swing arm system that couples to the loading system and the shuttle transfer system, the swing arm system configured to adjust a position of the loading system relative to the vehicle.

15 Claims, 10 Drawing Sheets

(56) References Cited

U.S. PATENT DOCUMENTS

| | | | | |
|---|---|---|---|---|
| 3,877,596 A * | 4/1975 | Bohman | ................... | B60P 1/36 |
| | | | | 414/501 |
| 3,885,686 A * | 5/1975 | Siebring | ................ | B60P 1/483 |
| | | | | 414/549 |
| 4,009,792 A * | 3/1977 | Sano | ......................... | B60P 1/52 |
| | | | | 414/512 |
| 4,051,969 A * | 10/1977 | Homanick | ................ | B60P 1/36 |
| | | | | 414/679 |
| 4,093,089 A * | 6/1978 | Bohman | ................... | B60P 1/36 |
| | | | | 198/733 |
| 4,274,789 A * | 6/1981 | Martin | ..................... | B60P 1/52 |
| | | | | 414/501 |
| 5,683,221 A * | 11/1997 | Ablabutyan | .......... | B60P 1/4457 |
| | | | | 414/545 |
| 8,956,102 B2 * | 2/2015 | Alasfour | ................ | A61G 3/062 |
| | | | | 414/541 |
| 9,428,097 B2 * | 8/2016 | Konchan | ............... | B60P 1/6436 |
| 9,630,545 B1 * | 4/2017 | Corrigan | .................. | B60P 1/44 |
| 9,868,379 B2 * | 1/2018 | Boscher | ................. | B60P 1/436 |
| 10,232,757 B2 * | 3/2019 | Sawatzky | ................. | B60P 1/022 |
| 2007/0031228 A1 * | 2/2007 | Wilson | .................. | B60P 1/4457 |
| | | | | 414/545 |
| 2020/0054506 A1 * | 2/2020 | Gallingani | .............. | A61G 3/062 |

\* cited by examiner

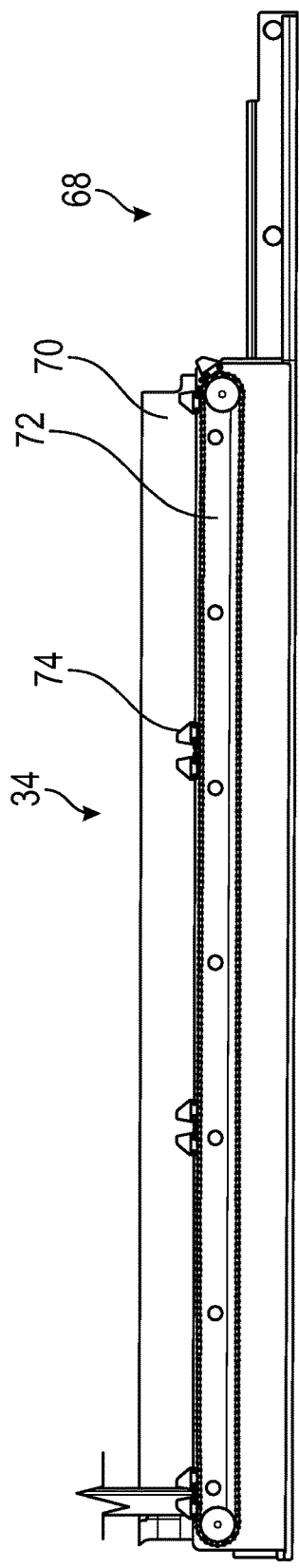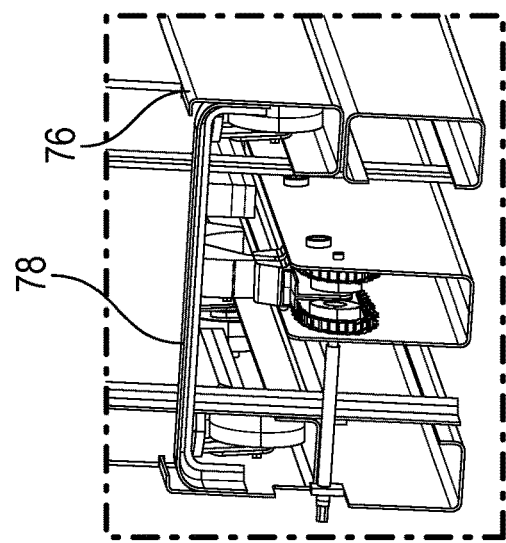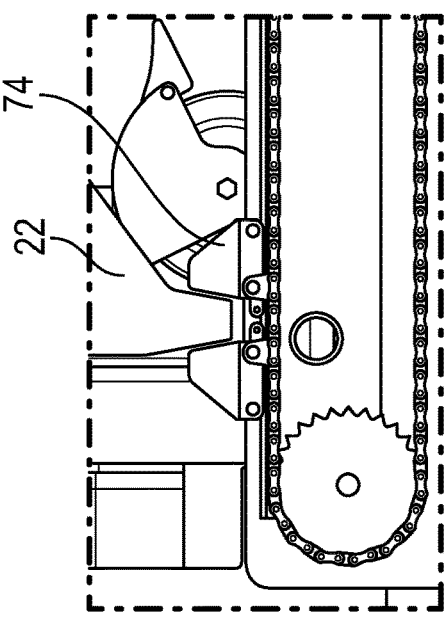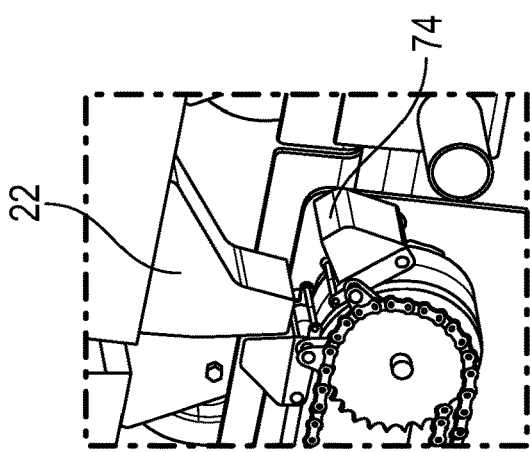
FIG. 9
FIG. 10
FIG. 11
FIG. 12

LOADING AND UNLOADING SYSTEMS AND METHODS

INTRODUCTION

The technical field generally relates to cargo loading systems and more particularly relates to cargo loading systems used to load one or more containers within a vehicle.

Some vehicles may be used to transport items to various locations. The items to be transported can vary in size, shape and weight. The items are typically loaded onto the truck manually by an operator based on their size, shape, and weight. In some instances, loading of the items can be time consuming and taxing on the operator.

Accordingly, it is desirable to provide improved methods and systems for loading items onto a vehicle. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for loading and unloading an item onto a vehicle. In one embodiment, a system includes: a loading system configured to receive a locker configured to store the item; a shuttle transfer system configured to transfer the locker to a storage position within the vehicle; and a swing arm system that couples to the loading system and the shuttle transfer system, the swing arm system configured to adjust a position of the loading system relative to the vehicle.

In various embodiments, the loading system includes at least two rails configured to receive wheels or castors of the locker, and at least two ramps, wherein each of the at least two rails is coupled to a ramp of the at least two ramps.

In various embodiments, the at least two ramps are configured to pivot between a first position and a second position.

In various embodiments, the loading system includes a frame coupled to the at least two rails.

In various embodiments, the loading system includes a locking system configured to lock the locker onto the loading system.

In various embodiments, the locking system includes a plurality of pedals configured to pivot about pivot points and engage with a locking block of the locker.

In various embodiments, the plurality of pedals are at least one of mechanically controlled and electrically controlled.

In various embodiments, the shuttle transfer system includes an unlocking block configured to unlock the locker from the locking system.

In various embodiments, the swing arm system includes a plurality of mechanical links configured to swing between zero degrees and one hundred eighty degrees.

In various embodiments, swing movement of the swing arm system is at least one of electrically controlled, hydraulically controlled, and mechanically controlled.

In various embodiments, the swing movement is electrically controlled based on an electric motor and regenerative braking.

In various embodiments, the shuttle transfer system includes at least two rails configured to receive wheels or castors of the locker.

In various embodiments, the shuttle transfer system includes a shuttle mechanism that is at least one of chain driven, belt driven, and screw driven.

In various embodiments, the shuttle mechanism is disposed between the at least two rails.

In various embodiments, the shuttle transfer system includes shuttle transfer blocks configured to engage with a transfer block of the locker to enable lateral movement of the locker.

In various embodiments, the shuttle transfer system includes a plurality of shuttle transfer blocks spaced apart along a shuttle mechanism.

In various embodiments, the shuttle transfer system includes a profile retention flange guide configured to constrain cross-car movement and vertical movement of the locker.

In another embodiment, a vehicle is provided. The vehicle includes a first system. The first system includes: a loading system configured to receive a locker configured to store an item; a shuttle transfer system configured to transfer the locker to a storage position within the vehicle; and a swing arm system that couples to the loading system and the shuttle transfer system, the swing arm system configured to adjust a position of the loading system relative to the vehicle.

In various embodiments, the vehicle includes a second system, and the second system includes: a second loading system configured to receive a second locker configured to store the item; a second shuttle transfer system configured to transfer the second locker to a storage position within the vehicle; and a second swing arm system that couples to the second loading system and the second shuttle transfer system, the second swing arm system configured to adjust a position of the loading system relative to the vehicle.

In various embodiments, the first system is configured entirely within the vehicle.

BRIEF DESCRIPTION OF THE DRAWINGS

The exemplary embodiments will hereinafter be described in conjunction with the following drawing figures, wherein like numerals denote like elements, and wherein:

FIG. 9 is a cross-sectional view of a shuttle transfer system of the loading system in accordance with various embodiments;

FIG. 10 is an enlarged perspective view of shuttle transfer blocks of the shuttle transfer system and is an enlarged perspective view of a transfer block of the locker in accordance with various embodiments;

FIG. 11 is an enlarged cross-sectional view of an end of the shuttle transfer system in accordance with various embodiments;

FIG. 12 is a perspective view of the end of the shuttle transfer system in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In various embodiments, a combination of simple systems is implemented internal or external to a transport vehicle to collectively provide a rapid method of automatically loading and unloading cargo containers from a transport vehicle with minimal operator engagement. In various embodiments, a swing arm loading system provides rapid loading of cargo containers without the need for an external lift platform mechanism. In various embodiments, locking mechanisms automatically restrain the container when loading and unloading the cargo container. In various embodiments, a shuttle system interfaces with the locking mechanisms to ensure that movement is minimized and that the container is automatically secured.

For example, as shown in the exemplary embodiments of FIGS. 1-11, a system 10 is provided for loading items to and unloading items from a transport vehicle 12. As can be appreciated, the transport vehicle 12 may be any vehicle or non-vehicle transport element having cargo space including but not limited to, a truck, an aircraft, a marine vehicle, a train, etc. In various embodiments, the system 10 can be configured to enable loading and unloading at various entry points (e.g., a rear entry point (as shown), a side entry point, a front entry point, etc.). of the transport vehicle 12 by adjusting the orientation of the system 10 with respect to the transport vehicle 12. For exemplary purposes, the exemplary embodiments shown in the figures illustrate the unloading and loading at a rear entry point of the transport vehicle 12.

In various embodiments, the system 10 may be configured to be partially external and partially internal, entirely external, or entirely internal to the transport vehicle 12. For exemplary purposes, the exemplary embodiments shown in the figures illustrate the system 10 entirely internal to the transport vehicle 12.

Figure 1:
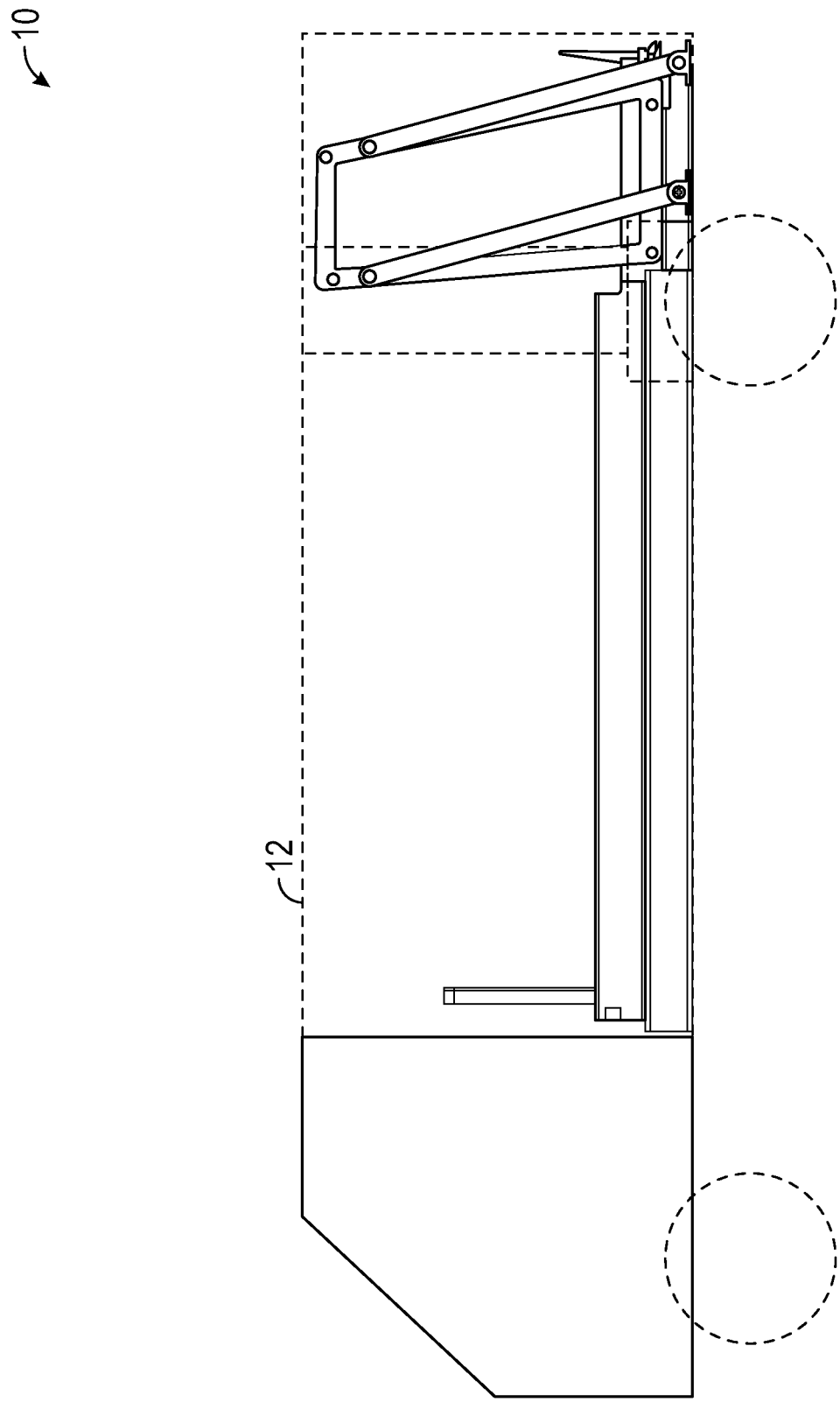
FIG. 1 is side cross-sectional view of a vehicle having a system in accordance with various embodiments.
Figure 2:
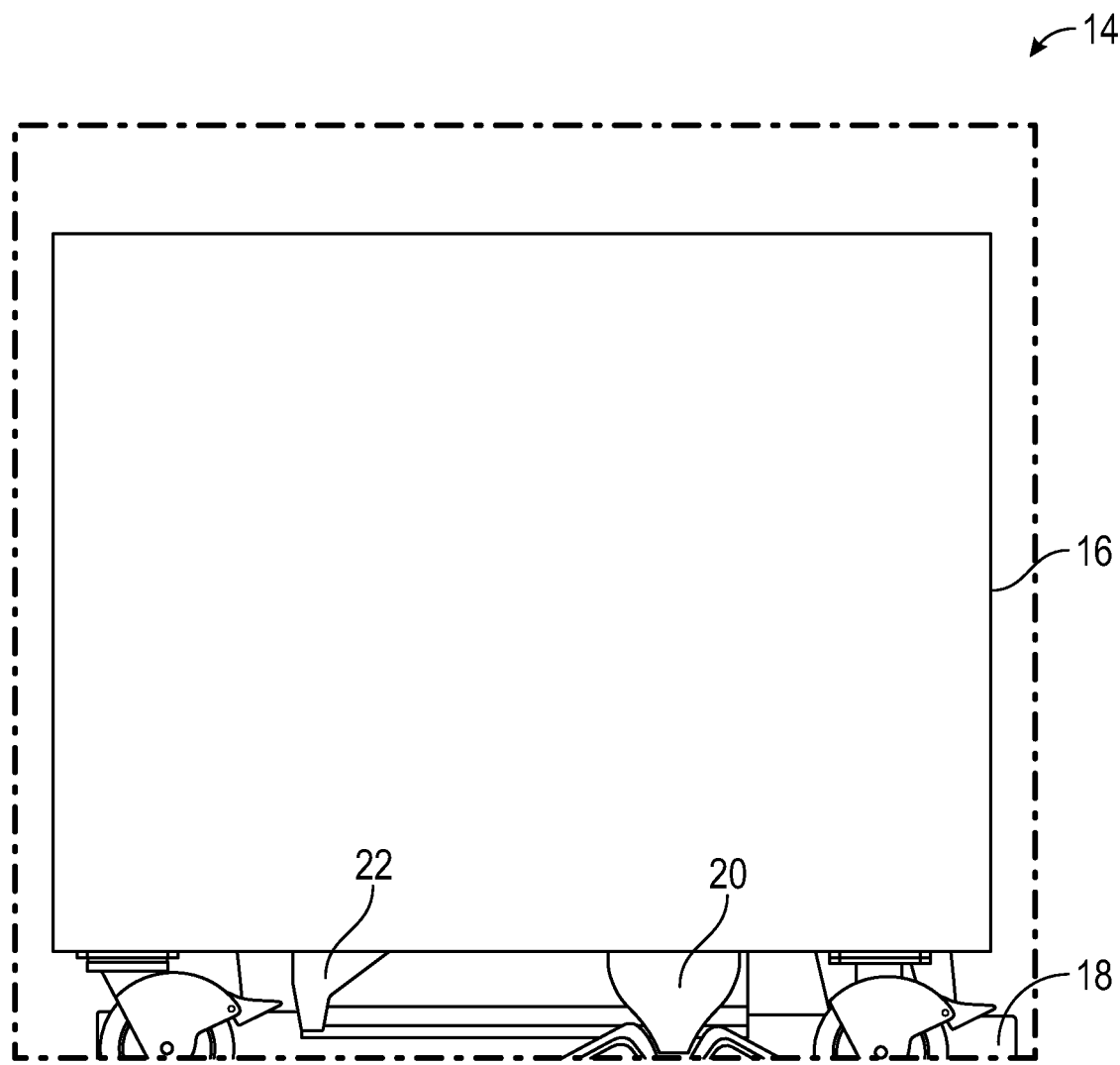
FIG. 2 is a side cross-sectional view of a portion of a locker configured to be used with the system in accordance with various embodiments.
Figure 3:
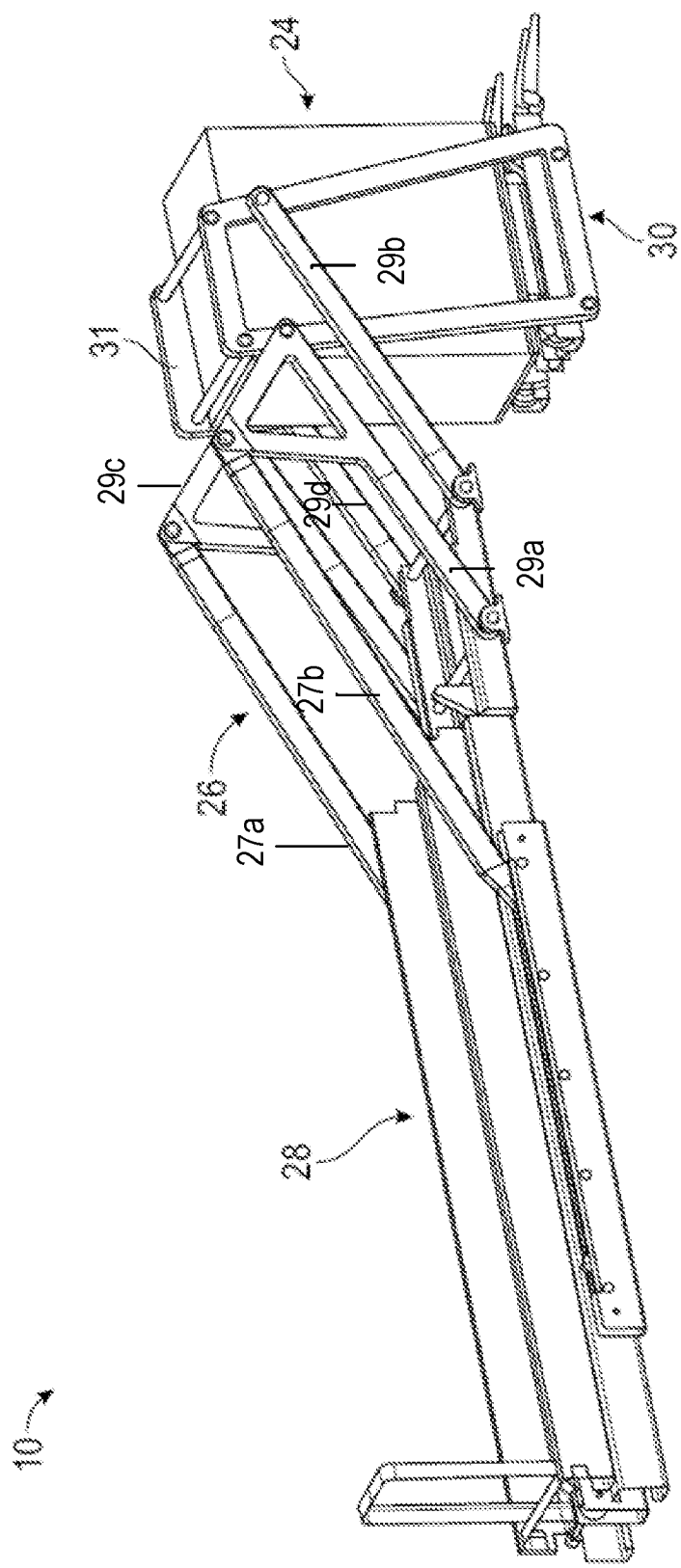
FIG. 3 is side perspective view of the system in accordance with various embodiments.

In various embodiments, the system 10 is configured to engage with a rolling chassis (hereinafter referred to as a locker 14) that is configured to receive and secure an item for transport. As shown in FIG. 2, the locker 14 includes a platform 16 supported by castors or wheels 18. In various embodiments, the platform 16 is implemented as a box or a cage. As can be appreciated, the platform 16 can have any configuration of horizontal surfaces and/or sidewalls for receiving an item and is not limited to the present box example. In various embodiments, the platform 16 includes a lock (not shown) to secure the item within the locker 14.

In various embodiments, the locker 14 further includes one or more locking blocks 20 coupled to the platform 16. For example, a locking block 20 can be located at a position offset from a centerline of the platform 16. The locking block 20 extends downward and includes surfaces configured to engage with a loading system 24 (FIG. 3) of the system 10, as will be discussed in more detail below.

In various embodiments, the locker 14 further includes a transfer block 22 coupled to the platform 16. For example, the transfer block 22 can be located at a position offset from the locking block 20, for example, along the centerline of the platform 16. The transfer block 22 includes surfaces configured to engage with a shuttle transfer system 28 (FIG. 3) of the system 10, as will be discussed in more detail below.

Figure 4:
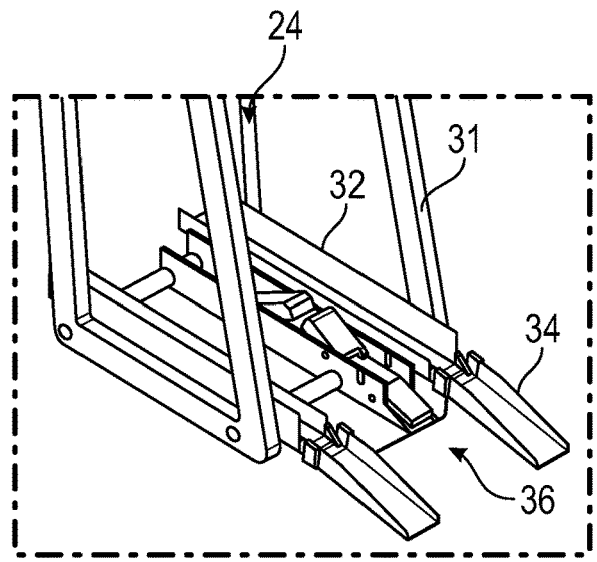
FIG. 4 is a perspective view of a loading system of the system in accordance with various embodiments.
Figure 5:
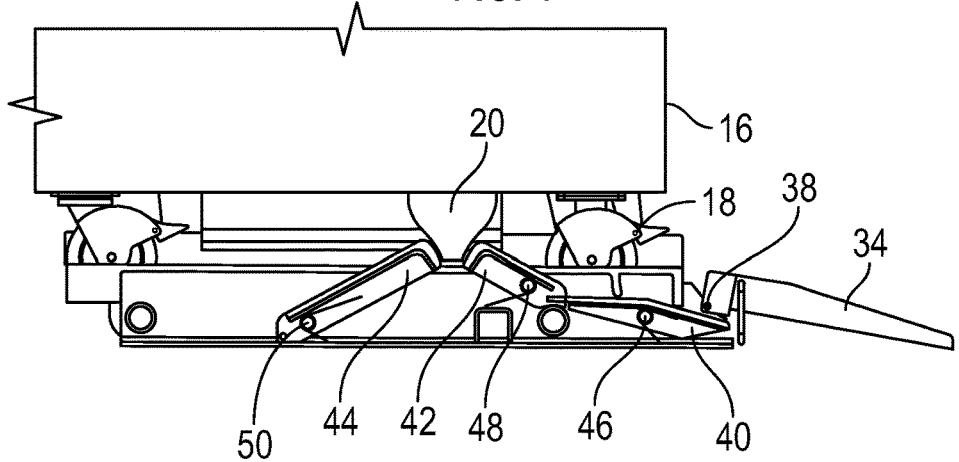
FIG. 5 is a cross-sectional view of the loading system having loaded a locker in accordance with various embodiments.
Figure 6:
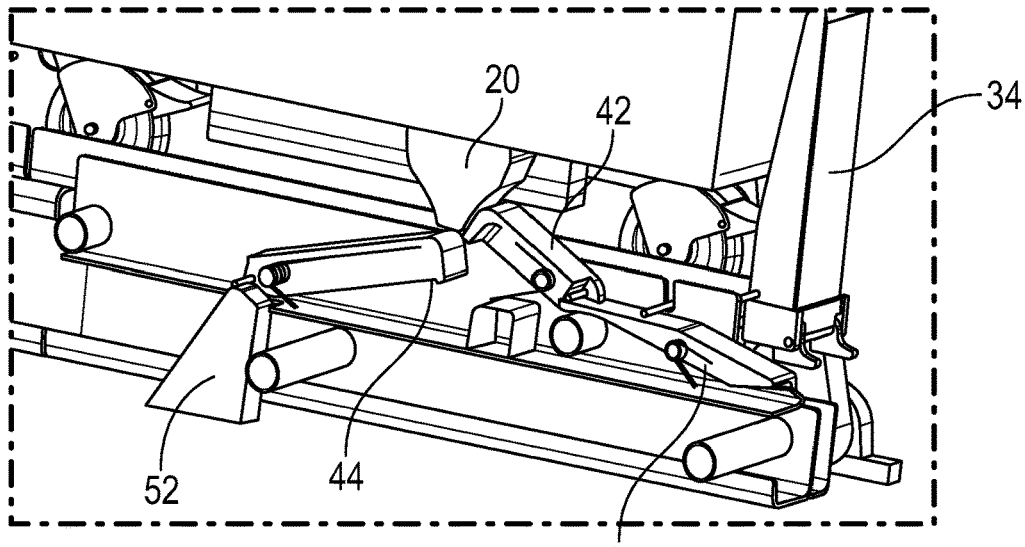
FIG. 6 is an enlarged perspective view of a locking system of the loading system and is an enlarged view of an unlocking block configured to unload the locker from a locking system in accordance with various embodiments.
Figure 8B:
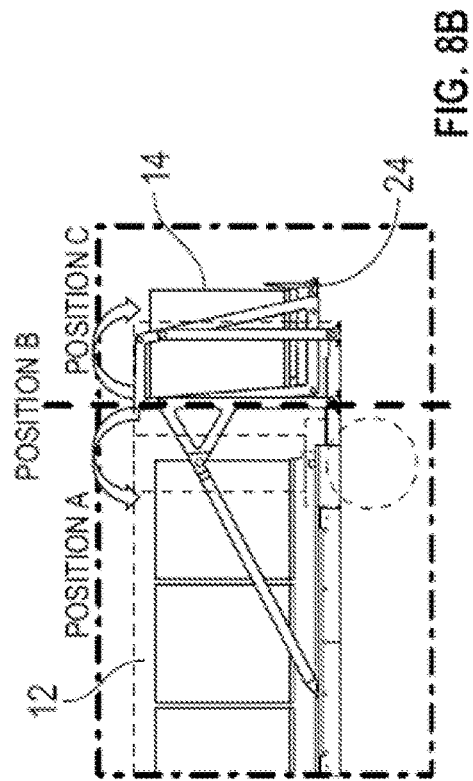
FIG. 8B is a graph illustrating torque curves for controlling the lift arm system in accordance with various embodiments.
Figure 8A:
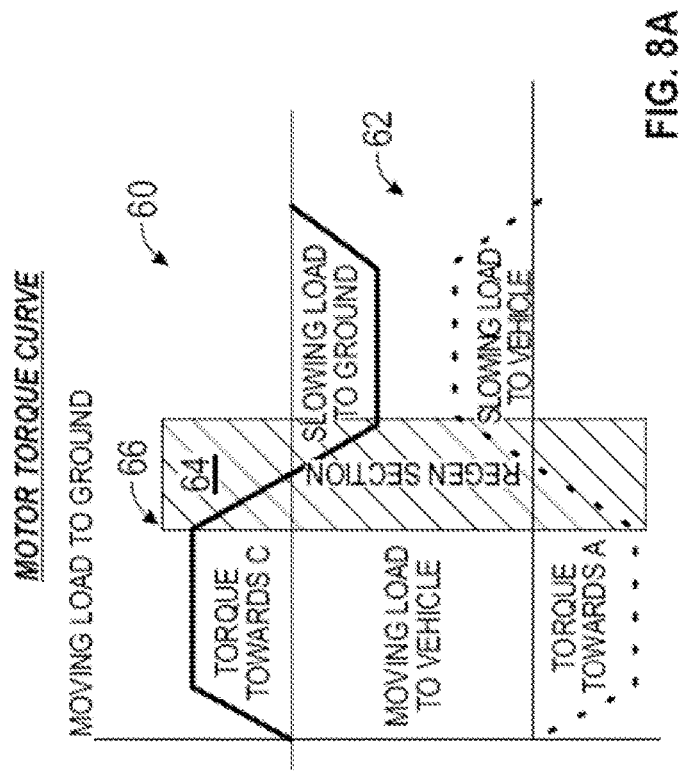
FIG. 8A is an illustration of locker positions in accordance with various embodiments.

With reference now to FIGS. 3-10, the system 10 generally includes the loading system 24, a swing arm system 26, and the shuttle transfer system 28. The loading system 24 includes a platform 30 and a frame 31 coupled to the swing arm system 26 and configured to onload and offload a container such as the locker 14. As shown in FIGS. 4-6, the platform 30 includes two or more rails 32, two or more ramps 34, and a locking system 36. The two or more rails 32 couple to the frame 31 and are configured substantially parallel for receiving the casters or wheels 18 of the locker 14. The two or more ramps 34 pivotably couple to the two or more rails 32 at pivot points 38. The two or more ramps 34 pivot between a loading position (as shown in FIG. 5) and a loaded position (as show in FIG. 6). When in the loading position, the ramps 34 permit loading of the locker 14 onto the loading system 24. When in the loaded position, the ramps 34 aid in preventing the locker 14 from rolling off the loading system 24.

In various embodiments, the locking system 36 is configured to engage with the locking block 20 of the locker 14 when the locker 14 is loaded onto the platform 30 to secure the locker 14 in place. For example, as shown in FIG. 5, the locking system 36 includes a series of pedals 40-44 configured to pivot between positions that selectively engage with a surface of the locking block 20. In various embodiments, the pedals 40-44 can be spring loaded (as shown) or electrically actuated to enable the pivoting.

For example, a first pedal 40 is spring loaded to pivot about a pivot point 46, a second pedal 42 is spring loaded to pivot about a pivot point 48, and a third pedal 44 is spring loaded to about a pivot point 50. When the locker is secured, the locking block 20 rests between the second pedal 42 and the third pedal 44 (as shown in FIG. 5). When the locker 14 is unsecured for loading onto the shuttle transfer system 28, the third pedal 44 pivots to release the locking block 20 from position. In various embodiments the third pedal 44 is activated by an unlocking block 52 configured as a part of the swing arm system 26 or the shuttle transfer system 28. When the locker 14 is unsecured for unloading from the loading system 24, the first pedal 40 pivots to release the locking block 20 from position. In various embodiments, the first pedal 40 is activated by an operator or electrically actuated, etc.

Figure 7:
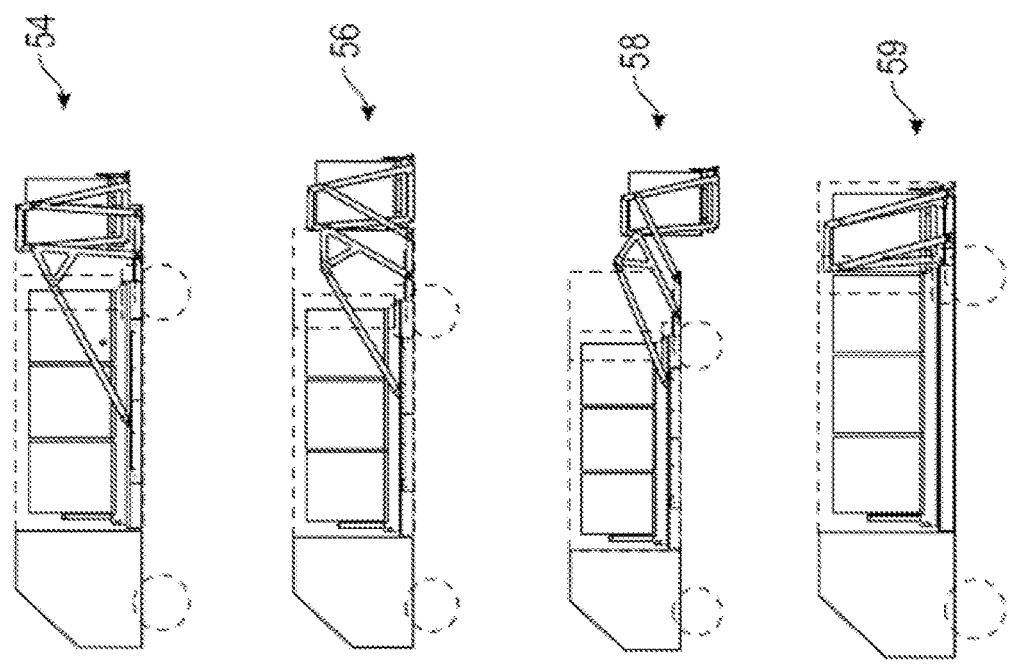
FIG. 7 is cross-sectional views of a lift arm system at different loading and unloading positions with respect to the vehicle in accordance with various embodiments.

With reference back to FIG. 3, the swing arm system 26 includes swing arms 27a-27b and mechanical linkages 29a-29d between the loading system 24 and the shuttle transfer system 28, allowing the arms 27a-27b to swing as shown in FIG. 7. In various embodiments, a four-link system can be coupled to the frame 31 of the loading system 24 and to a platform of the shuttle transfer system 28. For example, at least two link mechanisms 29a, 29b and 29c, 29d can be coupled on either side of the frame 31 at one end and can be coupled to the shuttle transfer system 28 at the other end. As can be appreciated, other linkage configurations can be implemented in various embodiments.

As shown in FIG. 7, the swing movement allows for rapid storage, unloading and loading from various levels. For example, unloading/loading can occur at a loading dock level that is higher than the transport vehicle 12 as shown at 54. In another example, unloading/loading can occur at a dock level at same height or slightly lower than transport vehicle 12 as shown at 56. In another example, unloading/loading can occur at a ground level at 58. Storage can occur at a level that corresponds to the shuttle transfer system 28 as shown at 59.

In various embodiments, the swing movement of the mechanical linkages can be electrically controlled, hydraulically controlled, mechanically controlled, or any combination thereof to ensure appropriate speed and acceleration for the size and weight of the item in the locker 14. When the linkages are electrically actuated by, for example, a motor (not shown), regenerative braking can be used to regulate the speed. For example, once the load platform passes position B (loading from position C or unloading from position A) shown in FIG. 8B, the load platform will want to freefall and accelerate. The motor can be controlled based on torque curves 60, 62 illustrated in the graph of FIG. 8A to enable regenerative braking during time 64 which begins at point B shown as 66 to slow the loading system 24 from freefalling onto the ground or into the transport vehicle 12. In such case, the regenerative braking would act as a dampening effect for the loading system 24. As can be appreciated, other means for regulating the speed and acceleration of the swing movement can be implemented in various embodiments.

With reference back to FIG. 3, the shuttle transfer system 28 interfaces with the swing arm system 26 and the loading system 24 to automatically disengage the locking block 20 and to allow the locker 14 to be shuttled and stored along a rail system 68 within the transport vehicle 12. For example, as shown in FIGS. 9-11, the rail system 68 includes two or more rails 70 and a shuttle mechanism 72. The two or more rails 70 are configured substantially parallel for receiving the casters or wheels 18 of the locker 14 and are configured to align substantially with the rails 32 of the loading system 24 when in the loaded position. The shuttle mechanism 72 is disposed between the rails 32 of the loading system and between the rails 70 of shuttle transfer system and can be chain driven, belt driven, screw driven, etc. to control locker movement (e.g., fore and aft) along the rails 32 and 70. As can be appreciated, the configuration of the shuttle mechanism 72 within the rails 32 and 70 permits for sufficient space to all for multiple systems 10 to be implemented within a transport vehicle 12, side by side.

In various embodiments, the shuttle mechanism 72 includes shuttle transfer blocks 74 that engage with the transfer block 22 of the locker 14 to ensure the locker 14 is held throughout fore/aft motion. As shown in FIG. 9, the shuttle transfer blocks 74 are spaced apart along the shuttle mechanism 72 to allow for storing unique locker sizes. As shown in FIG. 10, the shuttle transfer blocks 74 are positioned to provide clearance to the transfer block 22 and enable the loading system 24 (FIG. 3) to swing into position.

In various embodiments, the shuttle transfer system 28 includes a profile retention flange guide 76 configured to constrain cross-car and vertical movement of the locker 14. The flange guide 76 interfaces with the flange rail of the locker 14. By combining the retention flange guide 76 with the fore/aft control of the shuttle transfer blocks 74, the shuttle system automatically constrains the locker 14 for transport, avoiding the need for additional strapping of the locker 14 in the transport vehicle 12.

With reference now to FIGS. 13-16 and with continued reference to FIGS. 1-12, flow diagrams illustrate methods 100, 200 of loading a locker 14 to and unloading the locker 14 from the transport vehicle 12. As can be appreciated, one or more steps of the methods 100, 200 can be added or removed without altering the spirit of the methods 100, 200. In various embodiments, the methods shown 100, 200 include sensor feedback for communicating the status of the system 10. In various embodiments, one or more steps of the method may be automated by a control system, and/or operator performed.

Figure 13:
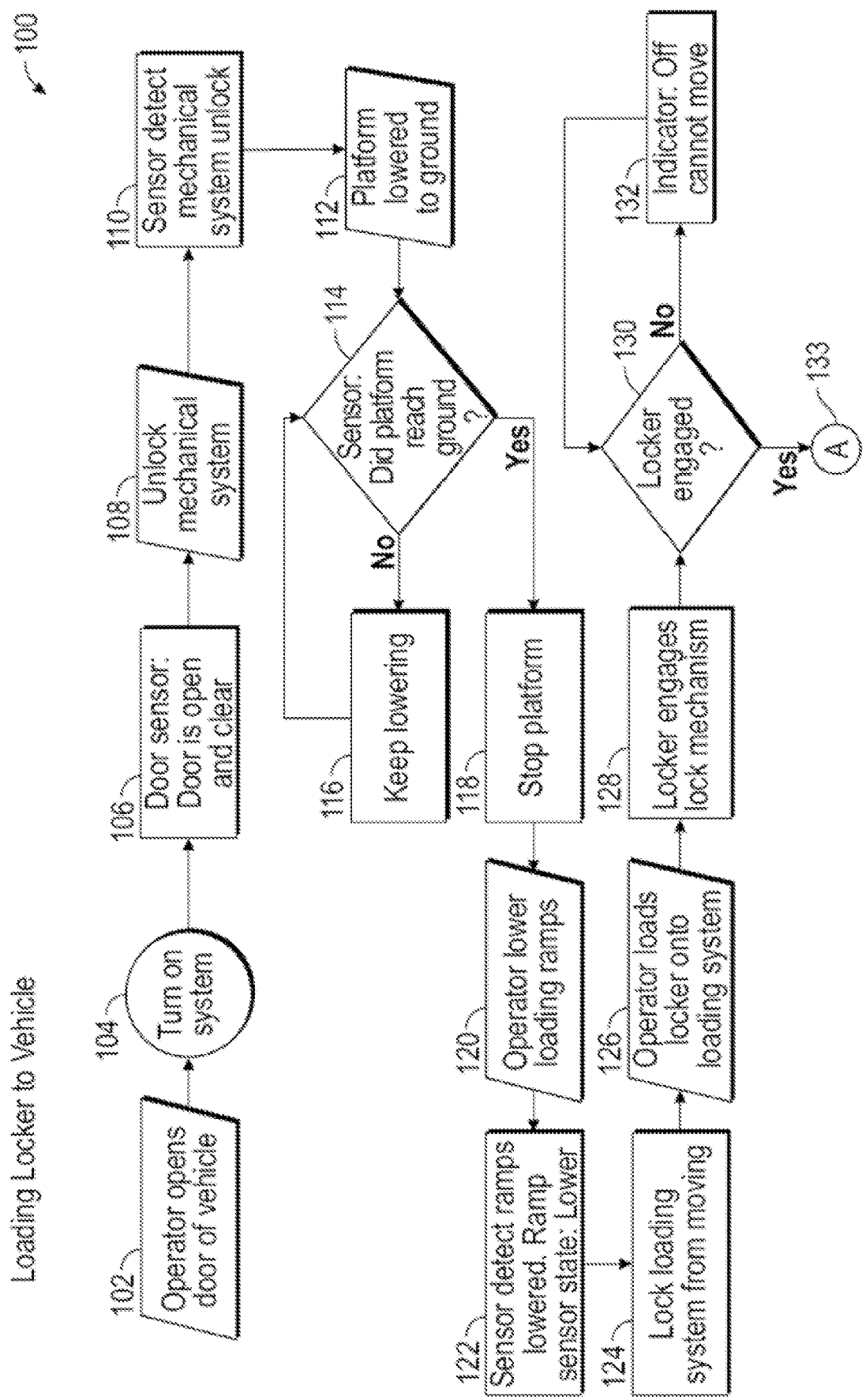
FIGS. 13-14 are flow diagrams illustrating a method of loading a locker by the system in accordance with various embodiments.
Figure 14:
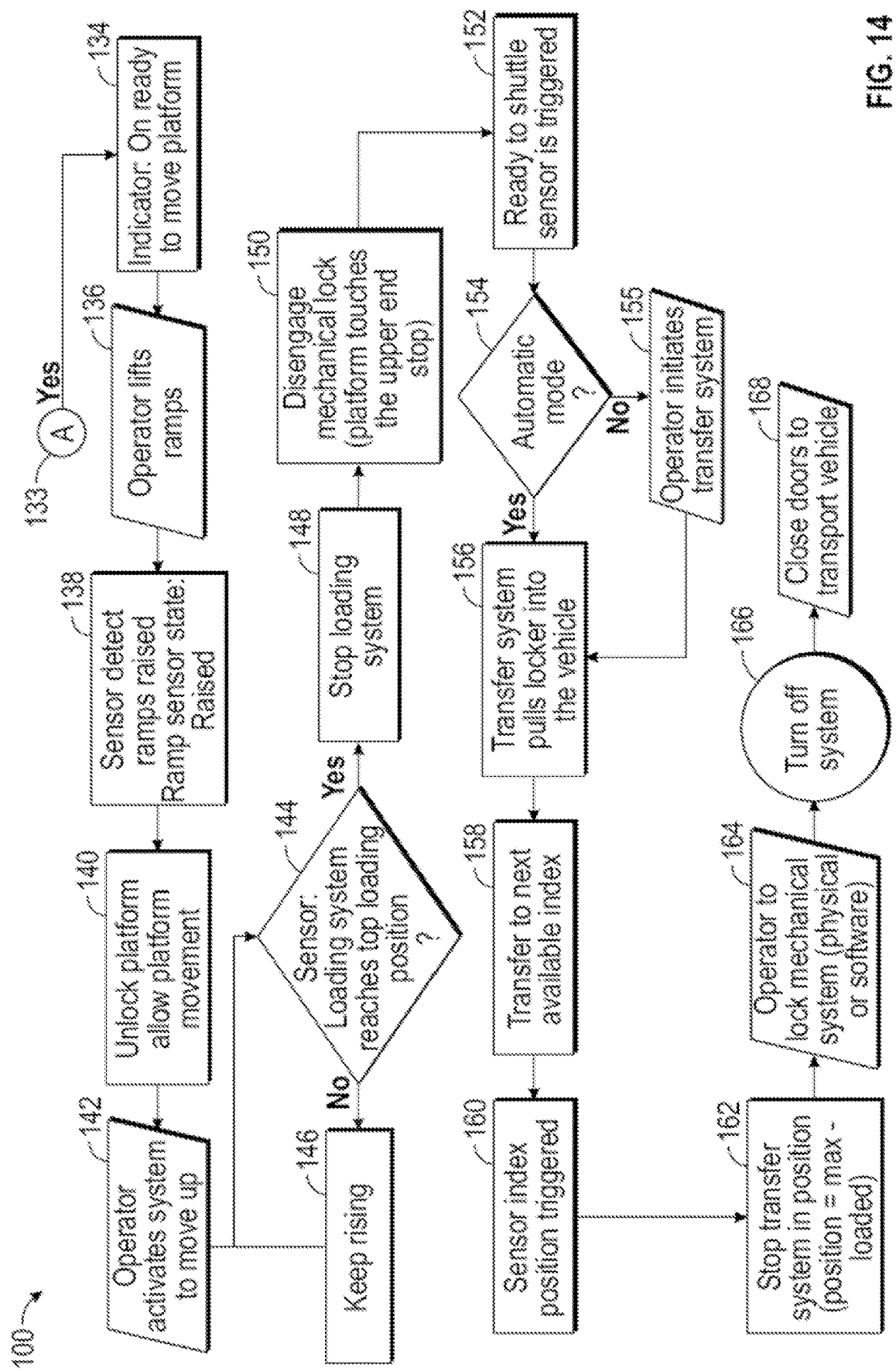

FIGS. 13-14 illustrate an exemplary method 100 of loading the locker 14 onto the transport vehicle 12. At 102, an operator opens a door of the transport vehicle 12 thereby activating the system 10 at 104. A sensor reports the door is open and clear at 106. The mechanical system is unlocked (e.g., by physical or software) at 108 and a sensor detects the system unlock at 110. The loading system 24 is lowered to the loading level at 112. A sensor reports the level of the loading system 24 at 114. When the loading system 24 has not reached the desired level at 114, the loading system 24 continues to lower at 116. When the loading system 24 reaches the desired level at 114, the lowering is stopped at 118.

Thereafter, the ramps 34 are lowered to the loading position at 120. A sensor detects that the ramps 34 are lowered at 122. The loading system 24 is optionally locked from moving at 124 and the operator loads the locker 14 onto the loading system 24 at 126. The loading system 24 engages the locking block 20 of the locker 14 at 128. The sensor reports the engagement status of the locking block 20 at 130. When the locking block 20 is not engaged at 130, the swing arm system 26 is prevented from moving at 132. When the locking block 20 is engaged at 128, the method continues at 133.

From 133, the swing arm system 26 is permitted to move and a notification is sent to indicate the status at 134. Once ready to move, the ramps 34 are lifted at 136. A sensor detects the ramps 34 are raised at 138 and the loading system 24 is unlocked at 140 to allow movement.

Thereafter, the swing arm system 26 is activated to move up at 142. A sensor reports whether the locker 14 has reached the top loading position at 144. When the locker 14 has not reached the top loading position at 144, the swing arm system 26 keeps rising at 146. When the locker 14 reaches the top loading position at 144, the loading system is stopped at 148 and mechanical lock is disengaged at 150 (e.g., the platform touches an upper end stop). A sensor reports whether the locker 14 is ready to shuttle at 152. When the shuttle transfer system 28 is not in automatic mode at 154, the operator initiates the transfer onto the shuttle transfer system 28 at 155. When the shuttle transfer system 28 is in automatic mode at 154, the shuttle transfer 28 system pulls the locker 14 onto the transport vehicle 12 at 156 and transfers the locker 14 to the next available shuttle transfer block 74 at 158. A sensor indicates a position of the transfer block 22 at 160. Once the locker 14 is in position, the shuttle transfer system 28 is stopped at 162 (position=max-loaded). The operator locks the mechanical system at 164 and turns the system 10 off at 166. The operator closes the doors to the transport vehicle 12 at 168.

Figure 15:
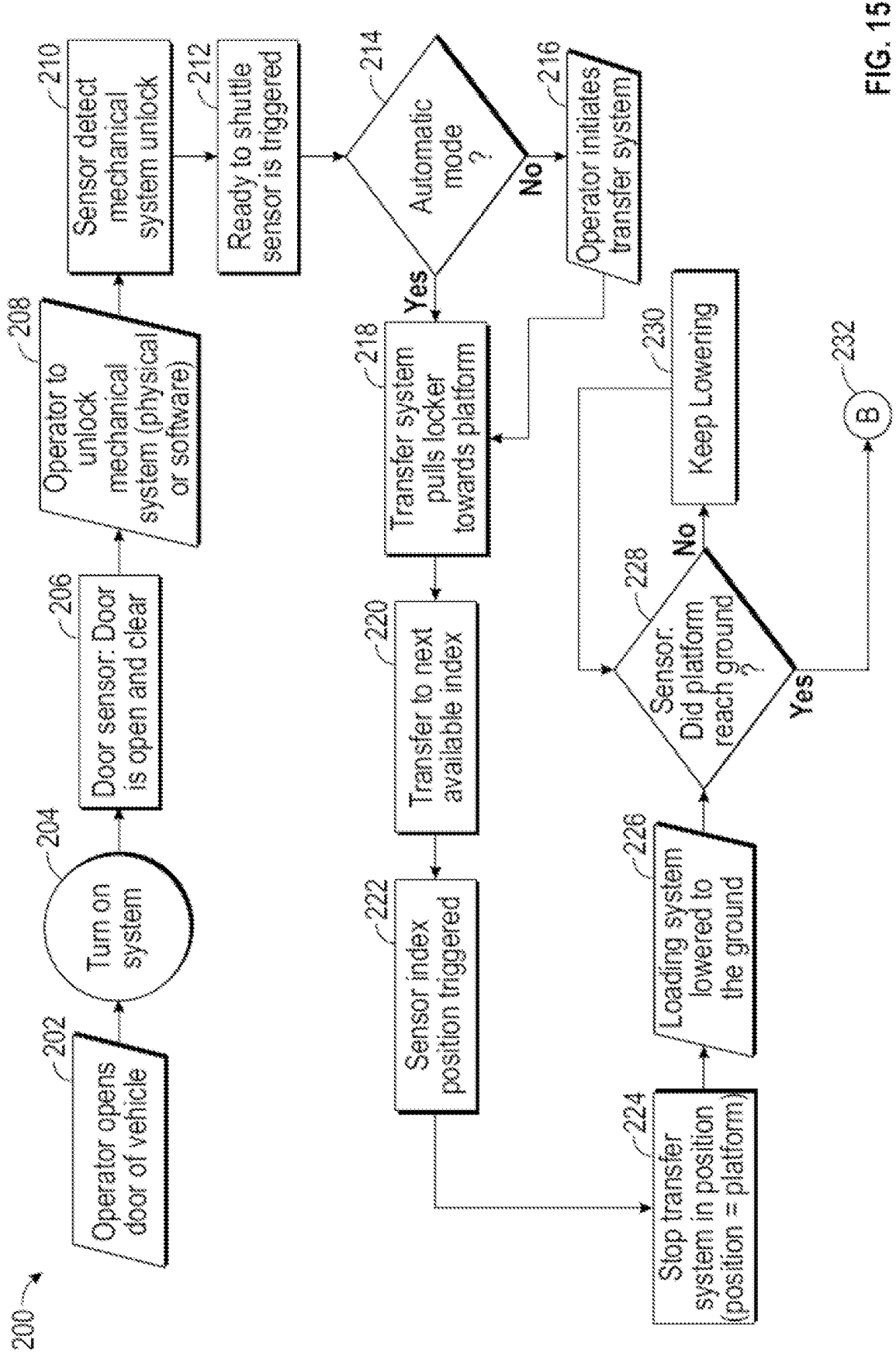
FIGS. 15-16 are flow diagrams illustrating a method of unloading a locker by the system in accordance with various embodiments.
Figure 16:
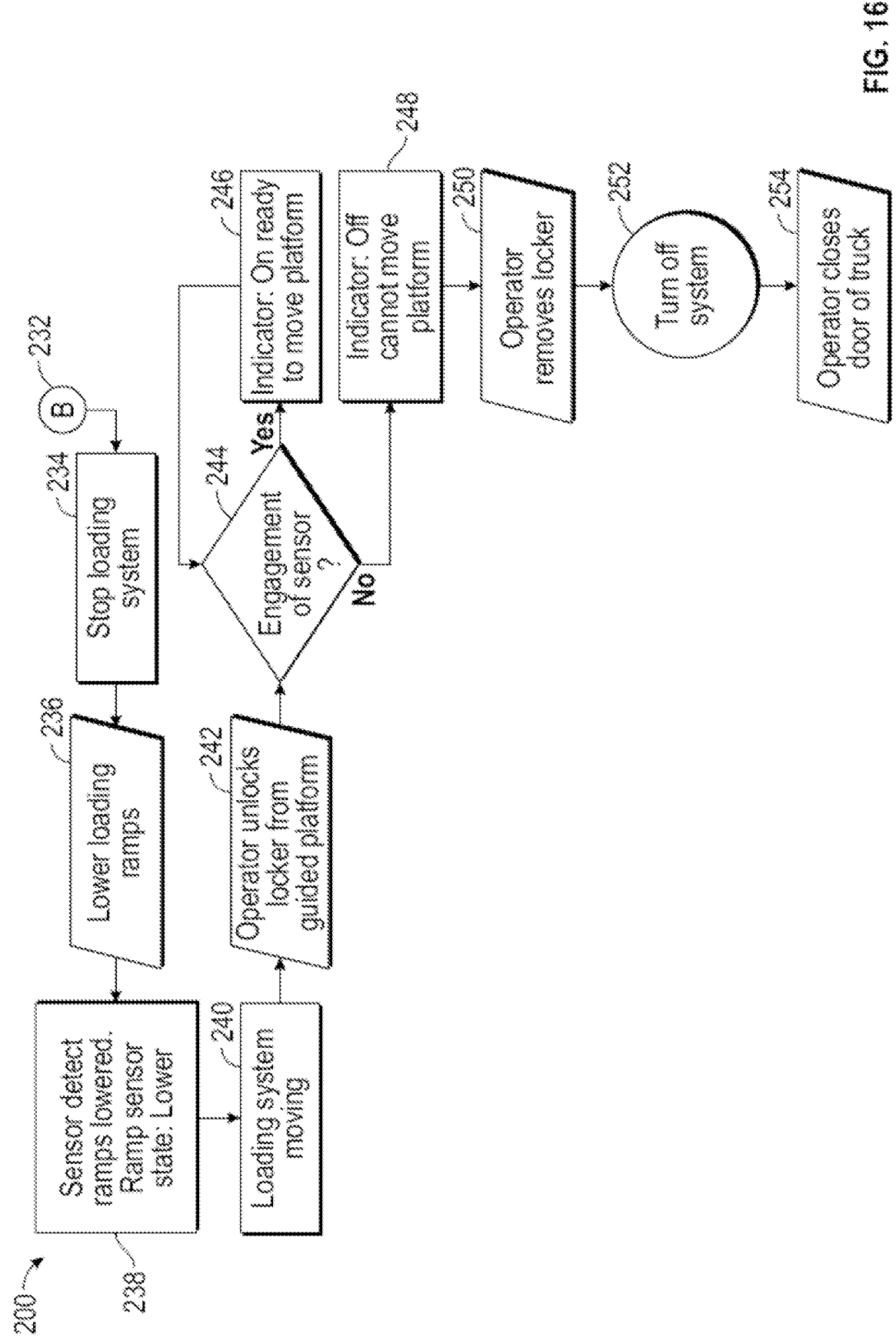

In FIGS. 15-16, a flow diagram illustrates an exemplary method 200 for unloading the locker 14 from the transport vehicle 12. At 202, the operator opens the door to the transport vehicle 12. The system is activated at 204. A sensor reads door is open and clear at 206. The operator unlocks the mechanical system at 208. A sensor detects the mechanical unlock at 210. A ready to shuttle sensor is triggered at 212. If the system is not set to an automatic mode at 214, the operator initiates the transfer at 216. If the system is set to automatic mode at 214, the shuttle transfer system 28 pulls the locker 14 at 218. The locker 14 is transferred to the next available locking block 20 at 220. A sensor indicates a position at 222. The shuttle transfer system 28 is stopped in position (position=platform) at 224. The loading system 24 is lowered to the ground at 226. A sensor detects whether the platform reached the ground at 228. If the platform has not reached the ground at 228, keep lowering at 230. Once the platform has reached the ground at 228, the method continues at 232.

From 232, the platform is stopped at 234. The loading ramps 34 are lowered to the unload position at 236. A sensor detects the lowered ramps 34 at 238. The loading system 24 is locked from moving at 240. The locker 14 is unlocked from the loading system 24 at 242. If a sensor indicates the locker 14 is still locked at 244, a notification is sent indicating the locker 14 cannot move at 246. If a sensor indicates the locker 14 is unlocked at 244, a notification is sent indicating the locker 14 is ready to move at 248. The locker 14 is removed from the loading system 24 at 250. Optionally the operator may choose to load a new locker onto the loading system to load into the vehicle (method 100) or return the loading system into the vehicle if no longer required. The system 10 is turned off at 252 and the operator closes the door to the transport vehicle 12 at 254.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for loading and unloading an item onto a vehicle, comprising:
   a loading system configured to receive a locker configured to store the item, wherein the loading system comprises at least two rails configured to receive wheels or castors of the locker, a locking system disposed between the at least two rails, and at least two ramps, wherein each of the at least two rails is coupled to a ramp of the at least two ramps, wherein the loading system comprises a frame coupled to the at least two rails, wherein the frame includes a first side that couples to a first rail of the at least two rails, a second side that couples to a second rail of the at least two rails, and a top side that couples to the first side and the second side;
   a shuttle transfer system configured to transfer the locker to a storage position within the vehicle; and
   a swing arm system that couples to the loading system and the shuttle transfer system, the swing arm system configured to adjust a position of the loading system relative to the vehicle.

2. The system of claim 1, wherein the at least two ramps are configured to pivot between a first position and a second position.

3. The system of claim 1, wherein the swing arm system comprises a plurality of mechanical links configured to swing.

4. The system of claim 1, wherein swing movement of the swing arm system is at least one of electrically controlled, hydraulically controlled, and mechanically controlled.

5. The system of claim 4, wherein the swing movement is electrically controlled based on an electric motor and regenerative braking.

6. The system of claim 1, wherein the shuttle transfer system comprises at least two rails configured to receive wheels or castors of the locker.

7. The system of claim 6, wherein the shuttle transfer system comprises a shuttle mechanism that is at least one of chain driven, belt driven, and screw driven.

8. The system of claim 7, wherein the shuttle mechanism is disposed between the at least two rails.

9. A system for loading and unloading an item onto a vehicle, comprising:
   a loading system configured to receive a locker configured to store the item, wherein the loading system comprises at least two rails configured to receive wheels or castors of the locker, a locking system disposed between the at least two rails, and at least two ramps, wherein each of the at least two rails is coupled to a ramp of the at least two ramps;
   a shuttle transfer system configured to transfer the locker to a storage position within the vehicle; and
   a swing arm system that couples to the loading system and the shuttle transfer system, the swing arm system configured to adjust a position of the loading system relative to the vehicle, wherein the locking system is configured to lock the locker onto the loading system during movement of the loading system;
   wherein the locking system comprises a plurality of pedals configured to pivot about pivot points and engage with a locking block of the locker; and
   wherein the shuttle transfer system comprises an unlocking block configured to engage with a pedal of the plurality of pedals to release the locking block from the locking system to unlock the locker from the locking system.

10. The system of claim 9, wherein the plurality of pedals are at least one of mechanically controlled and electrically controlled.

11. The system of claim 9, wherein the shuttle transfer system comprises shuttle transfer blocks configured to engage with a transfer block of the locker to enable lateral movement of the locker.

12. The system of claim 11, wherein the shuttle transfer system comprises a plurality of shuttle transfer blocks spaced apart along a shuttle mechanism.

13. The system of claim 11, wherein the shuttle transfer system comprises a profile retention flange guide configured to constrain cross-car movement and vertical movement of the locker.

14. A vehicle, comprising:

a first system comprising:

a loading system configured to receive a locker configured to store an item, wherein the loading system comprises at least two rails configured to receive wheels or castors of the locker, a locking system disposed between the at least two rails, and at least two ramps, wherein each of the at least two rails is coupled to a ramp of the at least two ramps, wherein the loading system comprises a frame coupled to the at least two rails, wherein the frame includes a first side that couples to a first rail of the at least two rails, a second side that couples to a second rail of the at least two rails, and a top side that couples to the first side and the second side;

a shuttle transfer system configured to transfer the locker to a storage position within the vehicle; and a swing arm system that couples to the loading system and the shuttle transfer system, the swing arm system configured to adjust a position of the loading system relative to the vehicle.

15. The vehicle of claim 14, wherein the first system is configured entirely within the vehicle.

* * * * *